United States Patent [19]
Hlatky

[11] Patent Number: 6,040,261
[45] Date of Patent: Mar. 21, 2000

[54] SUPPORTED SINGLE-SITE CATALYST AND OLEFIN POLYMERIZATION PROCESS

[75] Inventor: Gregory G. Hlatky, Morrow, Ohio

[73] Assignee: Equistar Chemicals, LP, Houston, Tex.

[21] Appl. No.: 09/292,370

[22] Filed: Apr. 15, 1999

[51] Int. Cl.[7] .................................................. B01J 31/00
[52] U.S. Cl. .......................... 502/117; 502/104; 502/150; 502/152; 502/154; 502/155; 502/158; 502/159; 502/162; 502/167
[58] Field of Search ..................................... 502/104, 117, 502/150, 152, 154, 155, 158, 159, 162, 167

[56] References Cited

U.S. PATENT DOCUMENTS

| | | | |
|---|---|---|---|
| 5,026,798 | 6/1991 | Canich | 526/127 |
| 5,202,398 | 4/1993 | Antberg et al. | 526/129 |
| 5,254,707 | 10/1993 | Strickler et al. | 556/413 |
| 5,565,396 | 10/1996 | Frey et al. | 502/113 |
| 5,587,439 | 12/1996 | DiMaio | 526/142 |
| 5,643,847 | 7/1997 | Walzer, Jr. | 502/117 |
| 5,723,398 | 3/1998 | Rosen et al. | 502/103 |
| 5,824,620 | 10/1998 | Vega et al. | 502/117 |
| 5,846,895 | 12/1998 | Gila et al. | 502/107 |
| 5,846,943 | 12/1998 | Hindsgual et al. | 514/25 |
| 5,861,352 | 1/1999 | Gila et al. | 502/155 |
| 5,885,924 | 3/1999 | Ward | 502/401 |
| 5,886,186 | 3/1999 | Smith et al. | 546/311 |

FOREIGN PATENT DOCUMENTS

0757992A1  2/1997  European Pat. Off. .

OTHER PUBLICATIONS

Donald W. Carpenetti et al. "Application of Amine Elimination for the Efficient Preparation of Electrophilic ansa–Monocyclopentadienyl Group 4 Complexes Containing an Appended Amido Functionality. Structural Characterization of $[(C_4H_4)SiMe_2(N-t-Bu)]ZrCl_2(Nme_2H)$," *Organometallics* 1996 vol. 15, 1572–1581 no month available.

Eero I. Iiskola et al. "Cyclopentadienyl Surface as a Support for Zirconium Polyethylene Catalysts," *Macromolecules* 1997, vol. 30, 2853–2859 no month available.

Dong–ho Lee et al. "Polymerization of Ethylene by Using Zirconocene Catalyst Anchored on Silica with Trisiloxane and Pentamethylene Spacers," *Macromol. Rapid Comm.*, vol. 18, 427–431 (1997) no month available.

Toshiya Uozumi et al. "Copolymerization of Ethylene and 1–Octene with $Cp^*TiCl_3$ as Catalyst Supported on 3–Aminopropyltrimethoxysilane Treated $SiO_2$," *Macromol. Rapid Commun.*, vol. 18, 9–15 (1997) no month available.

Michael C. W. Chan et al. "Polystyrene Supports for Vanadium Ethylene Polymerisation Catalysts," *Chem. Commun.*, (1998) 1673 no month available.

*Primary Examiner*—Elizabeth D. Wood
*Attorney, Agent, or Firm*—Jonathan L. Schuchardt

[57] ABSTRACT

A process for making a supported, single-site catalyst is disclosed. The transition metal of the catalyst is tethered through a bridged, bidentate ligand that is covalently bound to the support. The catalyst is prepared in a two-step process that involves preparation of a supported ligand from an amine-functionalized support, followed by reaction of the supported ligand with a transition metal compound to give the "tethered" catalyst. An olefin polymerization process that uses the supported catalyst is also disclosed.

16 Claims, No Drawings

SUPPORTED SINGLE-SITE CATALYST AND OLEFIN POLYMERIZATION PROCESS

FIELD OF THE INVENTION

The invention relates to a supported single-site catalyst and a process for making it. The transition metal of the catalyst is tethered through a bridged, bidentate ligand that is covalently bound to the support. The invention also relates to an olefin polymerization process that uses the supported catalyst.

BACKGROUND OF THE INVENTION

Metallocene and non-metallocene single-site catalysts (hereinafter all referred to as single-site catalysts) provide olefin polymers with narrow molecular weight distribution, reduced low molecular weight extractables, enhanced incorporation of α-olefin comonomers, low density, and controlled content and distribution of long-chain branching. Because of these unique properties, the polymers often outperform polyolefins prepared with Ziegler-Natta catalysts.

Polymerization of an olefin with a single-site catalyst is usually conducted in solution. Solution polymerizations are easy to control, and they can be carried out under a broad range of process conditions. However, solution polymerizations require polymer products to be soluble in process solvents. For this reason, solution polymerization is usually suitable for making very low density polyethylene (VLDPE), plastomers, or elastomers that are soluble in hydrocarbons. Solution polymerization is usually not suitable for making polymers with poor solubility in hydrocarbons, such as high-density polyethylene (HDPE) or polypropylene (PP).

HDPE, PP and other olefin polymers of higher density and crystallinity are usually made in a continuous slurry, fluidized-bed gas phase, or bulk polymerization. In these polymerization processes, the catalyst and the polymer products are neither soluble in the process solvent nor in the monomer at the reaction temperature employed. Smooth and continuous operation of the slurry or gas phase process requires the catalyst particles not to clog or clump, and not to foul the reactor wall, the agitator blades, or the distributor plates. While Ziegler-Natta catalysts are commonly used in slurry and gas phase processes, single-site catalysts are generally not used because they are soluble either in the process solvent or in the monomer.

The importance of non-solution processes for making polyolefins has sparked efforts to immobilize single-site catalysts while retaining their "single-site" nature. Because the perception exists that the supported single-site catalyst can be leached from the support in the reaction solvent employed, one approach to immobilizing the metallocene complex is to covalently bind it to the support (see, e.g., Iiskola et al., *Macromolecules* 30 (1997) 2853, or Lee et al., *Macromol. Rapid Commun.* 18 (1997) 427). Another method is to synthesize an amine-functional support by reacting partly hydroxylated silica with 3-aminopropyltrimethoxysilane, and then reacting the support with $(C_5Me_5)TiCl_3$ to give a tethered metallocene catalyst (see Uozumi et al., *Macromol. Rapid Commun.* 18 (1997) 9). Amine-functionalized polystyrene has also been used to make supported imidovanadium catalysts useful for ethylene polymerization (Chen et al., *J. Chem. Soc. Chem. Commun.* (1998) 1673).

"Constrained geometry" or "open architecture" catalysts are known (see, e.g., U.S. Pat. No. 5,026,798 and EP 416,815). These unsupported catalysts comprise a metal complex of a cyclopentadienyl ring and a heteroatom bridged by a covalent group, for example, $Me_2Si(C_5Me_4)$(N-tBu)$TiCl_2$. These catalysts are highly active, and they enhance incorporation of long-chain (α-olefins into ethylene polymers.

New single-site catalysts are needed. Especially needed are supported single-site catalysts that can be used in non-solution olefin polymerizations without sacrificing their "single-site" character. Preferably, the catalysts would remain anchored to the support throughout the polymerization and would avoid reactor fouling. Valuable catalysts would have high activity and would give polyolefins with narrow molecular weight distribution, good long-chain α-olefin incorporation, and a controlled degree of long-chain branching. Ideally, the catalysts would be easy and inexpensive to prepare with readily available reagents.

SUMMARY OF THE INVENTION

The invention is a process for making a supported single-site catalyst in which the metal component is tethered through a bridged, bidentate ligand that is covalently bound to the support.

The process comprises two steps. First, an amine-functionalized support, Q—$NH_2$, reacts with a ligand compound of the formula X—A—L, in which X is a leaving group, A is a linking group, and L is a polymerization-stable pi-bonded ancillary ligand that is covalently bonded to the linking group. This gives a supported ligand of the formula: Q—NH—A—L. In step two, the supported ligand reacts with a transition or lanthanide metal compound to produce a tethered catalyst of the structure:

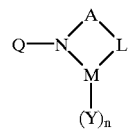

where M is a Group 3 to 10 transition or lanthanide metal, Y is a ligand selected from the group consisting of halide, alkoxy, siloxy, dialkylamino, $C_1$–$C_{10}$ alkyl, $C_6$–$C_{15}$ aryl, and $C_7$–$C_{15}$ aralkyl or alkaryl, and n is the number of Y groups and equals the valence of M minus 2.

The supported catalyst maintains its "single-site" nature: it has high reactivity and produces olefin polymers with narrow molecular weight distribution. Moreover, the supported single-site catalyst of the invention is stable in the olefin polymerization process. It is not leached from the support during the polymerization, and it does not cause reactor fouling.

DETAILED DESCRIPTION OF THE INVENTION

Supported catalysts of the invention are reaction products of a supported ligand and a transition metal compound. In step one of the process, the supported ligand is prepared from an amine-functionalized support.

Amine-functionalized supports useful in the invention have one or more primary amino groups and have the general structure Q—$NH_2$ in which Q is an inorganic solid or a polymer support. Suitable inorganic solids include silica, alumina, magnesia, titania, or the like, or mixtures thereof. Silica is preferred. Suitable polymer supports include polyolefins, polystyrenes, polyacrylates, polyurethanes, or the like. Amine functionality is introduced by any suitable method. Some amine-functionalized supports, such as aminomethylated polystyrene, are commercially available. Example 1 below illustrates a way to introduce primary amine functionality into a silica by reacting calcined silica with 3-aminopropyltrimethoxysilane. Other methods for making amine-functionalized supports are described in U.S. Pat. Nos. 5,846,943 and 5,886,186, the teachings of which are incorporated herein by reference.

The amine-functionalized support reacts with a ligand compound of the formula X—A—L to give a supported ligand of formula Q—NH—A—L. In the first formula, X is a leaving group. By "leaving group," we mean an anionic group that can be displaced in a nucleophilic substitution reaction by the primary amine-containing support. Examples include halide, alkoxy, siloxy, dialkylamino, and the like. Halides, especially, bromide, chloride, and iodide, are preferred.

Suitable "linking groups" (A) are bivalent groups that can form a bridge between the polymerization-stable ligand and the amine group of the support. Suitable linking groups include, for example, $Si(R)_2$, $CH_2$, CHR, $C(R)_2$, or the like. Particularly preferred is $Si(R)_2$.

The linking group is covalently bonded to a polymerization-stable pi-bonded ancillary ligand (L). L is most preferably a substituted or unsubstituted cyclopentadienyl (Cp') group with zero to four substituents (alkyl, aryl, aralkyl, alkoxy, halide, etc.), at least one of which is preferably methyl. Suitable L groups include, but are not limited to, isolobal analogues to the cyclopentadienyl ligand, such as substituted or unsubstituted boratabenzene ligands (boratabenzenes, boratanaphthalenes, borataanthracenes, etc.) bonded to A through a carbon atom or a group attached to the boron atom, pyrrole and indole ligands, open pentadienyl and cyclic pentadienyl (e.g., 1,1-dimethylcyclohexadienyl) ligands, azaborolinyl ligands bonded to A through a carbon atom or groups attached to the nitrogen or boron atoms, dianionic cyclooctatetraenyl ligands, and dianionic borole ligands.

There are many ways to react the amine-functionalized support with the ligand compound X—A—L. Example 2 below illustrates one approach. Usually, the reaction is conducted in suspension or solution in the presence a base such as triethylamine. The amine-functionalized support is typically suspended or dissolved in an organic solvent such as THF. The base and the X—A—L compound are added to the suspension or solution. The reaction is preferably carried out at a temperature within the range of about 40° C. to about 80° C., more preferably from about 50° C. to about 60° C. The molar ratio of the support amino groups to the ligand compound is preferably within the range of about 0.90 to about 1.10, more preferably from about 0.95 to about 1.05, and most preferably 1.0. The reaction product is conveniently isolated from the reaction mixture by filtration, and is usually washed and dried to yield a supported ligand.

The supported ligand prepared as described above reacts with a transition metal compound to produce a "tethered" catalyst. Suitable transition metal compounds are Group 3 to 10 transition or lanthanide metal compounds that can coordinate with both the amine group and the Cp group of the supported ligand. Group 4 to 6, especially Group 4, transition metal compounds are preferred. Suitable transition metal compounds include, for example, $Ti(NMe_2)_4$, $Zr(NMe_2)_4$, $Ti(NBu_2)_4$, $Ti(OR)_4$, $ZrCl_4$, $TiCl_4$, $Zr(CH_2Ph)_4$, $Ti(CH_2Ph)_4$, or the like.

The second step is preferably conducted by suspending the supported ligand in a solvent such as toluene, and adding the transition metal compound to the suspension. The reaction mixture is then conveniently heated to reflux until the reaction is complete. The reaction product is preferably isolated by filtration, washed with a solvent, and dried to yield a supported catalyst of the invention.

The invention includes an olefin polymerization process that uses a supported catalyst of the invention, optionally, with an activator such as an alumoxane, Lewis acid activators such as $B(C_6F_5)_3$, or an ionic borate such as $[Ph_3C][B(C_6F_5)_4]$. Other suitable activators are well known in the art. The boron-based activators may be used with aluminum alkyls such as triethylaluminum, which alkylates the metal and makes it more susceptible to reaction with the boron reagent to generate an active catalytic species.

The olefin polymerization is preferably performed at a temperature within the range of about 70° C. to about 200° C., more preferably from about 80° C. to about 180° C., and most preferably from about 80° C. to about 150° C. The polymerization process is preferably conducted under pressure. The pressure is preferably in the range of 150 to 5,000 psi, more preferably from 500 to 3,000 psi, and most preferably from 1,000 to 2,000 psi. Generally, the higher the pressure, the more productive the process.

The invention includes gas phase, slurry, and bulk polymerizations. Saturated aliphatic and aromatic hydrocarbons are suitable solvents for a slurry process. It is desirable to use a solvent having a boiling point in the range of about 30° C. to about 150° C. Solvents of lower boiling point create high pressure. High-boiling solvents are difficult to remove at the end of the process. Suitable solvents include pentane, hexane, heptane, octane, toluene, xylene, and cyclohexane, and their mixtures such as Isopar G solvent (product of Exxon Chemical Company).

Chain transfer agents such as hydrogen can optionally be used to control the molecular weight of the product. The amount of hydrogen used depends on the desired product. Generally, if less hydrogen is used, a higher molecular weight polymer will be produced.

Preferred olefins are $C_2$–$C_{20}$ α-olefins, including ethylene, propylene, 1-butene, isobutylene, 1-pentene, 1-hexene, 1-octene, and mixtures thereof. Ethylene is particularly preferred. A particularly preferred mixture is ethylene with up to 40 wt. % of a $C_5$–$C_{20}$ long-chain α-olefin such as 1-hexene or 1-octene. Incorporating a long-chain α-olefin into polyethylene often improves properties.

Olefin polymers made by the invention include polyethylene, polypropylene, polybutylenes, ethylene/propylene copolymers, ethylene/hexene copolymers, and ethylene/octene copolymers, and the like. These polymers are widely used in the industry for making polyolefin films, sheets, molded parts, and many others.

The following examples merely illustrate the invention. Those skilled in the art will recognize many variations that are within the spirit of the invention and scope of the claims.

EXAMPLE 1

Preparation of Amino-Substituted Silica Support

Silica is calcined at 300° C. to have 1.60 mmol/g of hydroxyl group concentration. The calcined silica (16 g) is then charged into a 250-mL glass reactor which is equipped with a mechanical agitator and immersed in a thermostatic bath. Toluene (50 mL) is added to the reactor to slurry the silica, and then 3-aminopropyltrimethoxysilane (0.024 mole) is added to the slurry. The reactor contents are refluxed for 12 hours. The solid product is isolated by filtration, washed with dry toluene (5×100 mL), and then dried under vacuum for 12 hours. Nitrogen content of the product (by elemental analysis): 1.73 wt. %.

EXAMPLE 2

Supported Ligand Preparation

The modified silica support prepared in Example 1 (10 g, 12.3 mmole of supported amine) is suspended in THF (50 mL). To the suspension is added triethylamine (2.53 g, 25 mmole), and then $(C_5Me_4H)SiMe_2Cl$ (2.64 g, 12.3 mmole). The thick suspension is heated at 50° C. for two hours, and then cooled to 25° C. The suspension is filtered. The solid product is washed thoroughly with chloroform to remove triethylammonium hydrochloride, and is then washed with pentane and dried.

EXAMPLE 3

Metalation of Supported Ligand

The supported ligand prepared in Example 2 (1.0 g) is suspended in toluene (20 mL). $Ti(NMe_2)_4$ (0.25 g) is added to the suspension. The mixture is refluxed for 24 hours, and is then cooled to 25° C. The suspension is filtered. The solid product is washed thoroughly with toluene, then with pentane, and dried.

EXAMPLE 4

Preparation of Supported Ligand on Polystyrene Support

Aminomethylated polystyrene (10 g, 10 mmole of $-NH_2$, available from Aldrich) is dissolved in THF (50 mL). To the solution is added triethylamine (2.02 g, 20 mmole) followed by $(C_5Me_4H)SiMe_2Cl$ (2.14 g, 10 mmole). The mixture is refluxed for 24 hours, and is then cooled to 25° C. The solid product is isolated by filtration, and it is washed thoroughly with chloroform to remove the triethylammonium chloride. The product is then washed with pentane and dried.

EXAMPLE 5

Preparation of Metal Component on Polystyrene Support

The product of Example 4 is suspended in octane (50 mL). To the suspension is added $Ti(NMe_2)_4$ (2.23 g, 10 mmole). The mixture is refluxed for 24 hours, and is then cooled to 25° C. The solid product is isolated by filtration, then washed thoroughly with pentane and dried to give the supported mono(cyclopentadienyl)titanium complex.

EXAMPLE 6

Ethylene Polymerization

The supported complex prepared in Example 3 (500 mg, 0.61 mmole of the metal component) in pentane reacts with methylalumoxane (5 mL of 10% solution in toluene). The solvent is evaporated to yield the active catalyst. A portion of the catalyst is flushed with isobutane into a 1.7-L stainless-steel autoclave that contains dry, deoxygenated isobutane (850 mL) and triisobutylaluminum (0.5 mmole). The autoclave is heated to 80° C., and ethylene is introduced to bring the reactor pressure to 150 psig. The polymerization is carried out for 60 minutes. The reaction mixture is cooled to 25° C. The isobutane is flashed off and the polymer is isolated.

The preceding examples are meant only as illustrations; the following claims define the invention.

I claim:
1. A process which comprises:
   (a) reacting an amine-functionalized support of the structure: $Q-NH_2$ wherein Q is an inorganic solid or polymer support, with a compound of the formula $X-A-L$, wherein X is a leaving group, A is a linking group, and L is a polymerization-stable pi-bonded ancillary ligand that is covalently bonded to A, to produce a supported ligand of the formula: $Q-NH-A-L$; and
   (b) reacting the supported ligand with a transition or lanthanide metal compound to produce a tethered catalyst of the structure:

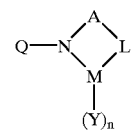

where M is a Group 3 to 10 transition or lanthanide metal, Y is a ligand selected from the group consisting of halide, alkoxy, siloxy, dialkylamino, $C_1-C_{10}$ alkyl, $C_6-C_{15}$ aryl, $C_7-C_{15}$ alkaryl or aralkyl, and n is the number of Y groups and equals the valence of M minus 2.

2. The process of claim 1 wherein the inorganic solid support is silica.
3. The process of claim 1 wherein the polymer support is polystyrene.
4. The process of claim 1 wherein the amine-functionalized support is prepared by reacting calcined silica with 3-aminopropyltrimethoxysilane.
5. The process of claim 1 wherein A is selected from the group consisting of $SiR_2$, $CH_2$, CHR, and $CR_2$ in which R is a $C_1-C_{10}$ alkyl group.
6. The process of claim 1 wherein L is a substituted or unsubstituted cyclopentadienyl (Cp') group.
7. The process of claim 1 wherein L is selected from the group consisting of unsubstituted or substituted boratabenzenes, pyrroles, indoles, open pentadienyls, cyclic pentadienyls, azaborolinyls, dianionic cyclooctatetraenyls, and dianionic boroles.
8. The process of claim 1 wherein the supported ligand is the reaction product of the amine-functionalized support and a cyclopentadienyl chlorodimethylsilane.
9. The process of claim 1 wherein the transition metal compound includes a Group 4 transition metal.
10. The process of claim 1 wherein the tethered catalyst has the structure:

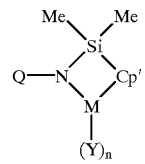

wherein Cp' is a substituted or unsubstituted cyclopentadienyl ligand and M is Zr or Ti.
11. A catalyst prepared by the process of claim 1.
12. A process which comprises:
   (a) reacting an amine-functionalized support of the structure: $Q-NH_2$ wherein Q is an inorganic solid or polymer support, with a compound of the formula X—A—L, wherein X is a leaving group, A is a linking group, and L, which is selected from the group consisting of substituted and unsubstituted cyclopentadienyls, boratabenzenes, pyrroles, indoles, open pentadienyls, cyclic pentadienyls, azaborolinyls, dianionic cylcooctatetraenyls, and dianionic boroles, is covalently bonded to A to produce a supported ligand of the formula:

Q—NH—A—L; and (b) reacting the supported ligand with a transition or lanthanide metal compound to produce a tethered catalyst of the structure:

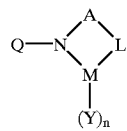

where M is a Group 3 to 10 transition or lanthanide metal, Y is a ligand selected from the group consisting of halide, alkoxy, siloxy, dialkylamino, $C_1$–$C_{10}$ alkyl, $C_6$–$C_{15}$ aryl, $C_7$–$C_{15}$ alkaryl or aralkyl, and n is the number of Y groups and equals the valence of M minus 2.

13. The process of claim 12 wherein the transition metal compound includes a Group 4 transition metal.

14. The process of claim 12 wherein A is selected from the group consisting of $SiR_2$, $CH_2$, CHR, and $CR_2$ in which R is a $C_1$–$C_{10}$ alkyl group.

15. A catalyst prepared by the process of claim 12.

16. A process which comprises:

(a) reacting an amine-functionalized inorganic solid, Q—$NH_2$, where Q is silica, with Cl—Si(Me)$_2$—Cp', where Cp' is a substituted or unsubstituted cyclopentadienyl moiety, to produce a supported ligand of the formula:

Q—NH—Si(Me)$_2$—Cp'; and (b) reacting the supported ligand with Ti(NMe$_2$)$_4$ to produce a tethered catalyst of the structure:

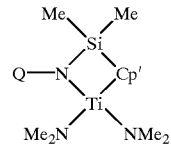

* * * * *